US006396787B1

(12) United States Patent
Lee et al.

(10) Patent No.: US 6,396,787 B1
(45) Date of Patent: May 28, 2002

(54) EIGHT-TO-FOURTEEN MODULATION (EFM) SIGNAL GENERATION IN OPTICAL DISK REPRODUCING SYSTEM USING EFM DEMODULATED SIGNAL ERROR CORRECTION FLAGS

(75) Inventors: Suk-jung Lee, Seongnam; Soowoong Lee, Seoul, both of (KR)

(73) Assignee: Samsung Electronics, Co., Ltd. (KR)

( * ) Notice: Subject to any disclaimer, the term of this patent is extended or adjusted under 35 U.S.C. 154(b) by 0 days.

(21) Appl. No.: 09/476,567

(22) Filed: Jan. 3, 2000

(30) Foreign Application Priority Data

Mar. 25, 1999 (KR) ............................................. 99-10275

(51) Int. Cl.[7] ................................................. G11B 5/09
(52) U.S. Cl. .................................. 369/59.18; 369/53.35
(58) Field of Search ........................... 369/59.18, 59.17, 369/59.15, 59.16, 53.31, 47.18–19, 124.04, 53.35–36

(56) References Cited

U.S. PATENT DOCUMENTS

| 4,706,236 A | * | 11/1987 | Yoda ............................. 369/59 |
| 5,600,679 A | * | 2/1997 | Kadowaki et al. ........... 375/317 |
| 5,815,477 A | * | 9/1998 | Kimura et al. ................. 369/50 |
| 5,920,534 A | * | 7/1999 | Furuta et al. .................. 369/59 |
| 6,069,499 A | * | 5/2000 | Cho et al. ...................... 327/58 |

OTHER PUBLICATIONS

Philips Semiconductors, Digital servo processor and Compact Disc decoder (CD7), Feb. 26, 1998, Product Specification SAA7372.
Sony, CD Digital Signal Processor CXD2507AQ.
Block diagram, Self Slicing a DC–free Channel Code.

* cited by examiner

Primary Examiner—William Korzuch
Assistant Examiner—Gautam R. Patel
(74) Attorney, Agent, or Firm—Mills & Onello, LLP

(57) ABSTRACT

An apparatus and method for generating an eight-to-fourteen modulation (EFM) signal in an optical disk reproducing system, capable of accurately generating the EFM signal regardless of the kinds of defects of a disk. The apparatus for generating an EFM signal from a radio frequency (RF) signal reproduced from an optical disk, includes a data slicing unit for selecting, in response to a selection signal, a first slice reference level generated by correcting the asymmetry of the RF signal, or a second slice reference signal generated using peak and bottom envelopes of the RF signal and the first slice reference level, to be a third slice reference level. The data slicing unit slices the RF signal based on the third slice reference level and outputs the slicing result as the EFM signal. A selection signal generating unit generates the selection signal in response to the number of occurrences of error correction flags or EFM flags. An EFM flag generating unit generates the EFM flags in accordance with bit pattern which is not used in demodulating the EFM signal. The error correction flags are generated in accordance with the amount of error which is present in the demodulated EFM signal.

8 Claims, 6 Drawing Sheets

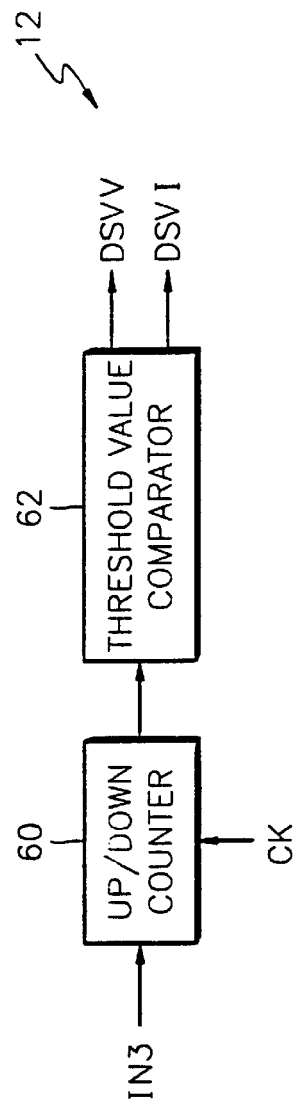
FIG. 3
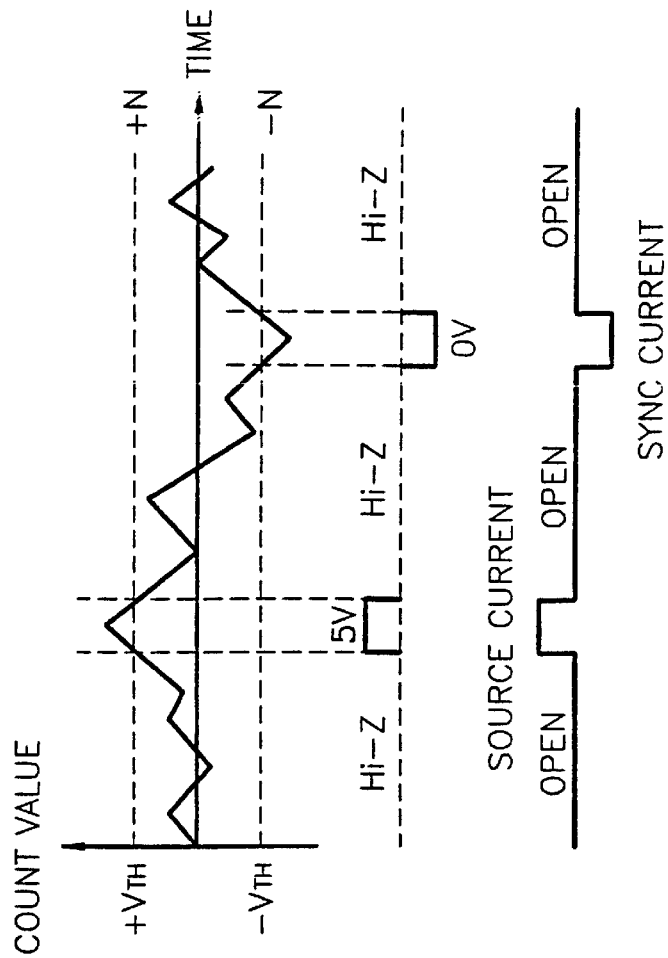
FIG. 4A
FIG. 4B
FIG. 4C

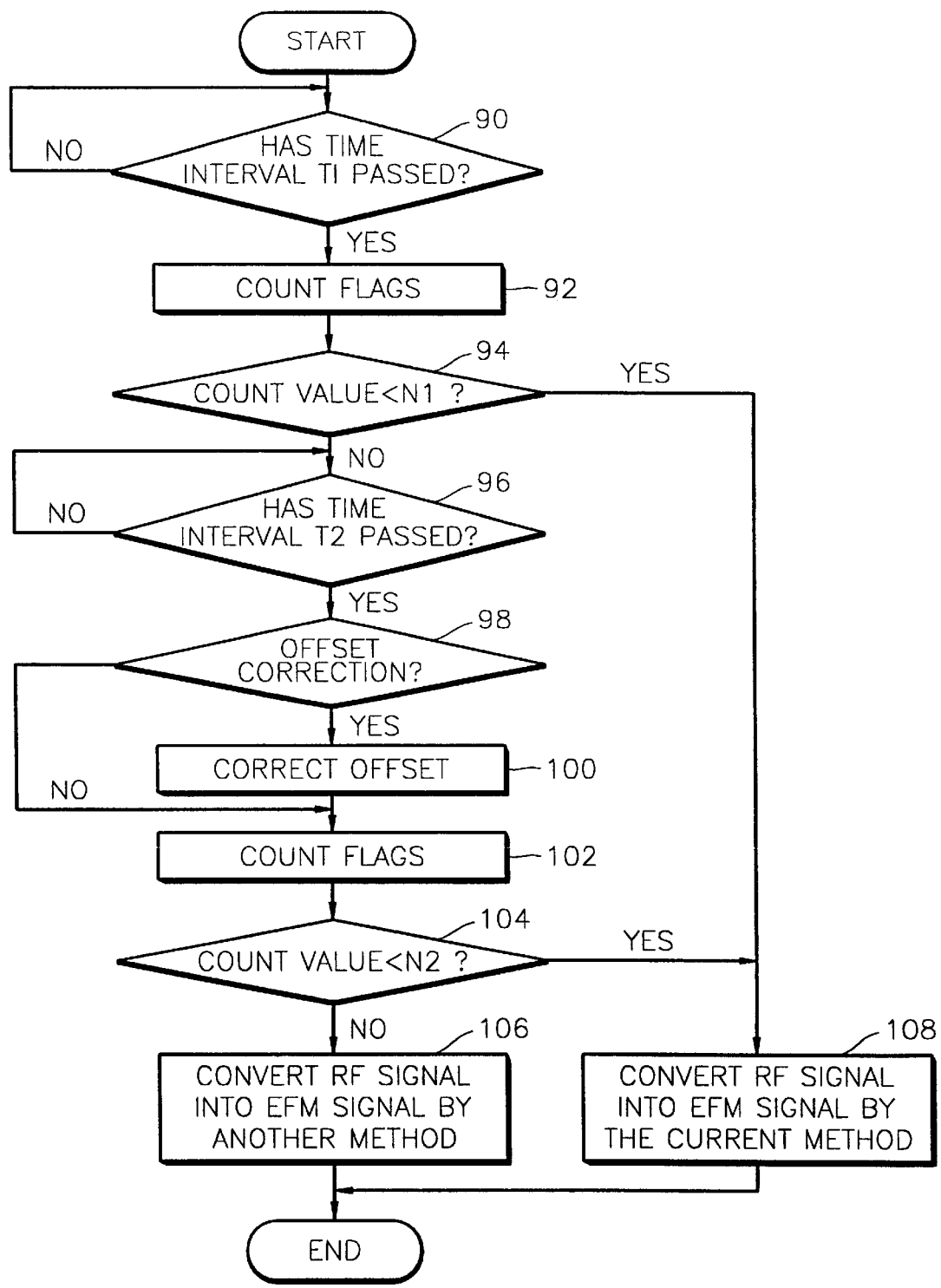

EIGHT-TO-FOURTEEN MODULATION (EFM) SIGNAL GENERATION IN OPTICAL DISK REPRODUCING SYSTEM USING EFM DEMODULATED SIGNAL ERROR CORRECTION FLAGS

BACKGROUND OF THE INVENTION

1. Field of the Invention

The present invention relates to optical disk reproducing systems, and more particularly, to an apparatus and method for generating an eight-to-fourteen modulation (EFM) signal in an optical disk reproducing system, in which a radio frequency (RF) signal is converted into the EFM signal.

2. Description of the Related Art

Optical disk reproducing systems relating to compact disk (CD) systems or digital video disk (DVD) systems pick up light reflected by an optical disk and convert the light into an RF signal. They then convert the RF signal into an EFM signal, and reproduce multi-media data stored in the disk using the EFM signal.

In the case where the optical disk has a defect, for example, a pin hole or pin depth defect, and is a wobble disk, i.e., a disk that is bent to such an extent that the RF signal vibrates, distortion exists in the RF signal itself, which is used to generate an EFM signal. Here, the term pin depth defect refers to a defect in which the depth of a pin hole defect in an optical disk is so deep that light cannot be reflected by the optical disk, resulting in failure in detection of an RF signal. The pin hole defect refers to when a hole, through which light passes, exists in the optical disk.

A conventional EFM signal detection apparatus which detects an EFM signal from a distorted RF signal when the RF signal is not accurately detected due to a defect of the disk such as that described above, using a level detection method or an envelope detection method. For example, a conventional EFM signal generating apparatus which slices an RF signal by receiving a digital sum value (DSV), which will be described later, has been disclosed by Philips Corporation, in an article entitled, "Data Slicer Showing Typical Application Components," Specification of SAA7372, p.10, 6 December 1995. A conventional EFM signal generating apparatus which generates an EFM signal by self-slicing an RF signal using a current type method, has been disclosed in a book by John Watkinson, entitled *The art of Digital Audio* (published by Focal Co., Inc.).

The above-mentioned conventional EFM signal detection apparatus using the level detection method corrects the asymmetry of an RF signal, generates a slice reference level using the asymmetry-corrected RF signal, and slices the RF signal based on the generated slice reference level, resulting in an EFM signal. Such a conventional EFM signal generating apparatus is suitable for compensating for distortion of an RF signal that is caused by a wobble disk, but not for that of an RF signal distorted by a defect of a disk such as the pin hole or pin depth defect.

The conventional EFM signal detection apparatus using the envelope detection method detects peak and bottom envelopes of an RF signal, extracts a slice reference level by calculating or amplifying the detected envelopes, and slices the RF signal based on the extracted slice reference level, to generate an EFM signal. This EFM signal detection apparatus is effective in compensating for distortion of an RF signal due to a defect of a disk such as pin hole or pin depth defect. However, the EFM signal detection apparatus adopting the envelop detection method cannot effectively compensate for the distortion of an RF signal from a wobble disk.

The conventional EFM signal generating apparatus cannot accurately generate an EFM signal from a distorted RF signal in the case where a defective disk is defective due to a pin hole or pin depth defect, or where the disk is a wobble disk.

SUMMARY OF THE INVENTION

An object of the present invention is to provide an apparatus for generating an eight-to-fourteen modulation (EFM) signal of an optical disk reproducing system, capable of accurately generating the EFM signal regardless of which defects exist in an optical disk.

Another object of the present invention is to provide a method for generating an EFM signal of an optical disk reproducing system, by which an EFM signal can be accurately generated regardless of which defects exist in an optical disk.

In an aspect of the present invention, there is provided an apparatus for generating an eight-to-fourteen modulation (EFM) signal in an optical disk reproducing system, the EFM signal generated from a radio frequency (RF) signal reproduced from an optical disk. A data slicing unit selects, in response to a selection signal, (i) a first slice reference level generated by correcting the asymmetry of the RF signal, or (ii) a second slice reference signal generated using peak and bottom envelopes of the RF signal and the first slice reference level, to be a third slice reference level. The RF signal is sliced based on the third slice reference level, and the slicing result is output as the EFM signal. A selection signal generating unit generates the selection signal in response to the number of occurrences of error correction flags or EFM flags. An EFM flag generating unit generates the EFM flags in accordance with a bit pattern which is not used in demodulating the EFM signal. The error correction flags are generated in accordance with the amount of error which is present in the demodulated EFM signal.

In another aspect of the present invention, there is provided a method of generating an EFM signal from an RF signal in an optical disk reproducing system. In this aspect, the method includes: (a) continuously determining whether a first predetermined time interval has passed; (b) if the first predetermined time interval has passed, counting flags; (c) determining whether the count result is less than a first predetermined value; (d) if the count result is less than the first predetermined value, converting the RF signal into the EFM signal by slicing the RF signal based on a slice reference level which is obtained by correcting asymmetry of the RF signal; (e) if the count result is not less than the first predetermined value, continuously determining whether a second predetermined time interval has passed; (i) if the second predetermined time interval has passed, counting the flags; (g) determining whether the count value obtained in (f) is less than a second predetermined value, and if the count value is less than the second predetermined value, moving the process to (d); and (h) if the count value obtained in (f) is not less than the second predetermined value, converting the RF signal into the EFM signal by slicing the RF signal based on a slice reference level which is obtained using peak and bottom envelopes of the RF signal, wherein the flags are generated in accordance with the bit pattern which is not used in demodulating the EFM signal or the amount of error which is present in the demodulated EFM signal.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 3 is a schematic block diagram of an example of the digital sum value calculating unit shown in FIG. 1 according to the present invention.

FIGS. 4A through 4C show waveforms for illustrating elements shown in FIG. 3.

FIG. 6 is a flowchart illustrating a method of generating an eight-to-fourteen modulation signal in the generating apparatus according to the present invention, which can be performed in the apparatus of FIG. 1.

DESCRIPTION OF THE PREFERRED EMBODIMENT OF THE INVENTION

Figure 1:
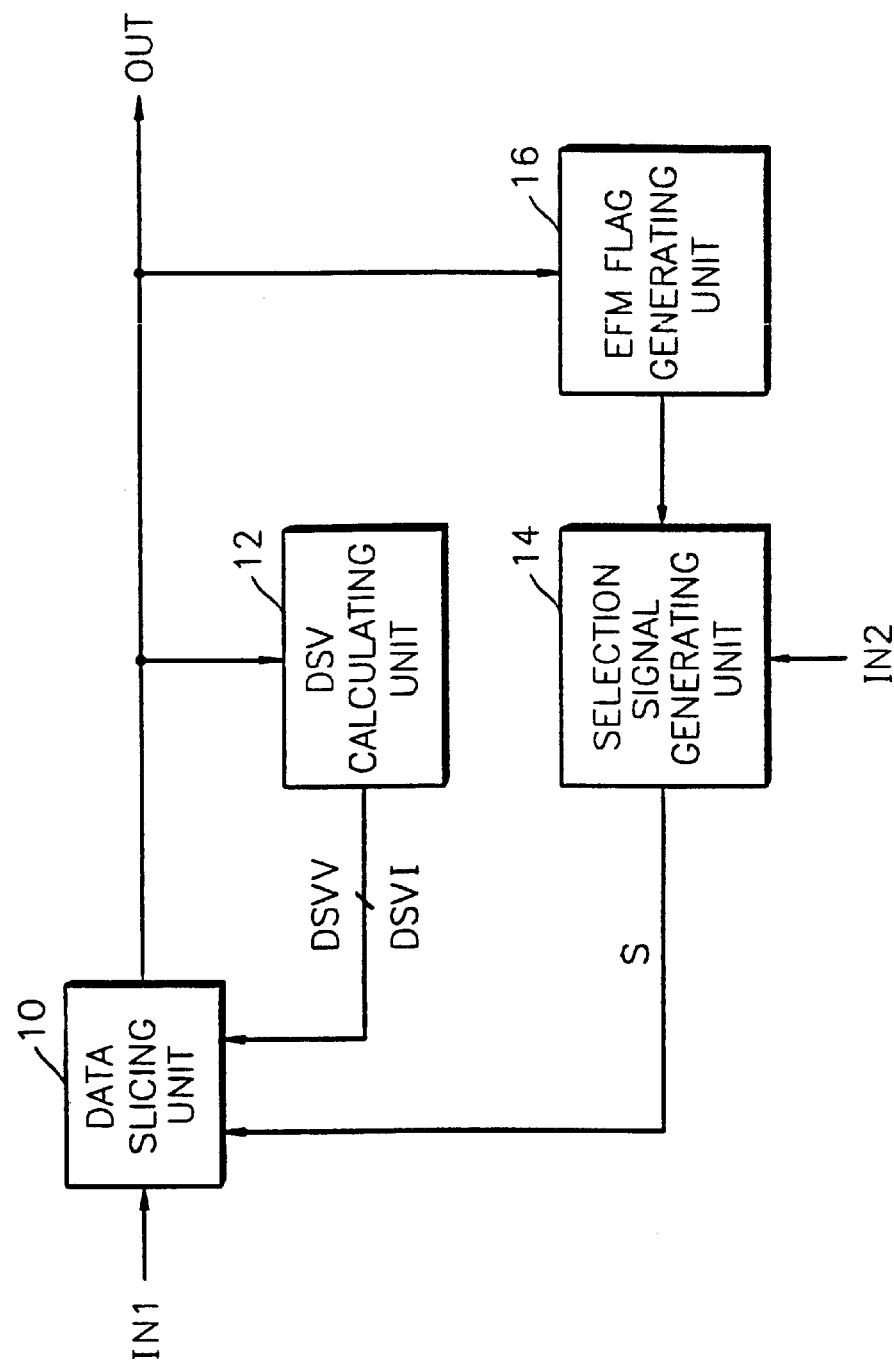
FIG. 1 is a schematic block diagram of an eight-to-fourteen modulation signal generation apparatus of an optical disk reproducing system according to one embodiment of the present invention.

Referring to FIG. 1, an eight-to-fourteen modulation (EFM) signal generating apparatus of an optical disk reproducing system according to one embodiment of the present invention includes a data slicing unit 10, a digital sum value (DSV) calculating unit 12, a selection signal generating unit 14, and an EFM flag generating unit 16. In the optical disk reproducing system, an optical pickup (not shown) irradiates light to an optical disk and picks up the light reflected by the optical disk, and a radio frequency (RF) amplifying portion (not shown) amplifies the picked up light to output the amplified light as an RF signal.

The data slicing unit 10 shown in FIG. 1 corrects the asymmetry of an RF signal, which is input through an input terminal IN1 from the RF amplifying portion, to generate a first slice reference level. The data slicing unit 10 also detects peak and bottom envelopes of the RF signal input through the input terminal IN1 and generates a second slice reference level using the first slice reference level and the detected peak and bottom envelopes. The data slicing unit 10 selects one of the first and second slice reference levels as a third slice reference level, in response to a selection signal S. The data slicing unit 10 slices the RF signal based on the third slice reference level and outputs the slicing result as an EFM signal to the DSV calculating unit 12, the EFM flag generating unit 16, and an EFM signal demodulating unit (not shown) through an output terminal OUT. The EFM signal demodulating unit, which is installed following the apparatus of FIG. 1, receives the EFM signal via the terminal OUT. It demodulates the input EFM signal and outputs the demodulated EFM signal to an error correction portion (not shown) for correcting error.

The DSV calculating unit 12 is included in order to correct the offset of the third slice reference level. That is, the DSV calculating unit 12 compares a count value, which is counted in accordance with the logic level of the EFM signal from the data slicing unit 10, to at least one predetermined threshold value, and outputs the comparison result to the data slicing unit 10 as a digital sum value (DSV). The data slicing unit 10 corrects the offset of the third slice reference level in response to the DSV, slices the RF signal using the offset-corrected third slice reference level, and outputs the slicing result as an EFM signal. The structure and operation of an example of the DSV calculating unit 12 will be described in detail below in connection with FIG. 3.

Figure 2:
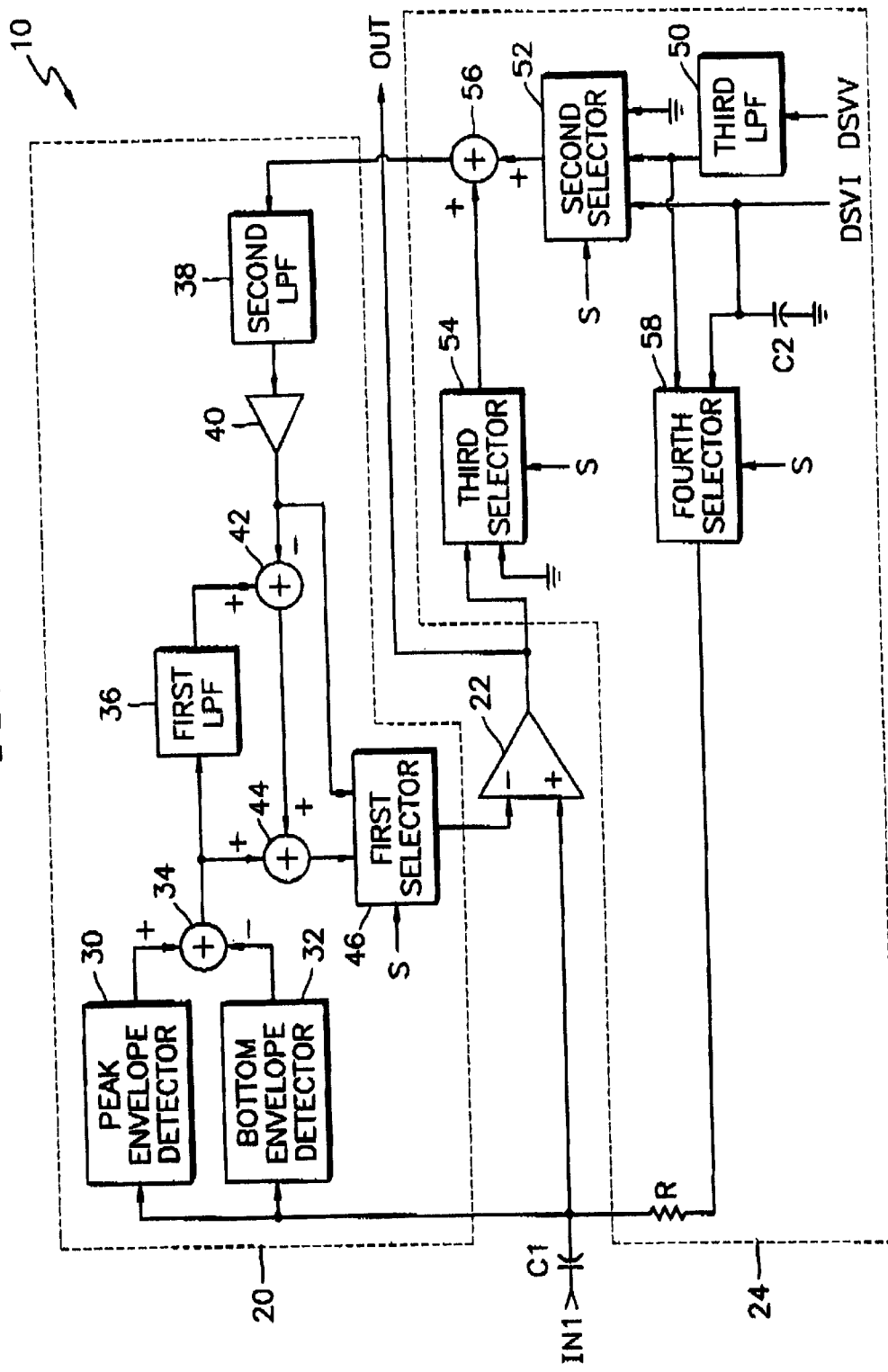
FIG. 2 is a schematic circuit diagram of an example of the data slicing unit shown in FIG. 1 according to the present invention.

FIG. 2 is a circuit diagram of one embodiment of the data slicing unit 10 of FIG. 1 according to the present invention. As shown in FIG. 2, the data slicing unit 10 comprises a slice reference signal generating portion 20 for detecting the third slice reference level from the RF signal, a comparator 22 for comparing the third slice reference level to the RF signal, an offset correcting portion 24 for correcting the offset of the third slice reference level, and a capacitor C1. Here, the capacitor C1 removes the direct current (DC) component of the RF signal input through the input terminal IN1.

The slice reference signal generating portion 20 of FIG. 2 comprises a peak envelope detector 30, a bottom envelope detector 32, subtractors 34 and 42, an adder 44, a first selector 46, first and second low pass filters (LPFs) 36 and 38, and an amplifier 40. The offset correcting portion 24 comprises second, third and fourth selectors 52, 54 and 58, an adder 56, a third LPF 50, a resistor R and a capacitor C2.

The peak envelope detector 30 of FIG. 2 detects the peak envelope of the RF signal, which is input through the input terminal IN1 and from which the DC component has been removed, and outputs the detected peak envelope to the subtractor 34. Similarly, the bottom envelope detector 32 detects the bottom envelope of the RF signal from which the DC component has been removed, and outputs the detected bottom envelope to the subtractor 34. Here, the subtractor 34 subtracts the bottom envelope from the peak envelope and outputs the subtraction result to the adder 44 and the first LPF 36. The first LPF 36 performs low-pass-filtering on the output from the subtractor 34, and outputs the result to the subtractor 42.

The second LPF 38 performs low-pass-filtering on the output from the adder 56, and outputs the result to the amplifier 40. The amplifier 40 amplifies the output from the second LPF 38 by a predetermined level, and outputs the amplified result to the subtractor 42 and the fist selector 46 as the first slice reference level. The subtractor 42 subtracts the output of the amplifier 40 from the output of the first LPF 36, and outputs the subtraction result to the adder 44. The adder 44 adds the output of the subtractor 42 to the subtraction result of the subtractor 34, and outputs the result to the first selector 46 as the second slice reference level. The first selector 46 selects the first slice reference level from the amplifier 40 or the second slice reference level from the adder 44 in response to a selection signal S, and outputs the selected slice reference level to the negative input terminal (−) of the comparator 22 as the third slice reference level.

The comparator 22 compares the third slice reference level from the first selector 46 to the RF signal from which the DC component has been removed, which is input through the positive input terminal (+) of the comparator 22, and outputs the comparison result to both the output terminal OUT and the third selector 54 as an EFM signal.

Here, it is assumed that the DSV, which is used to correct the offset of the third slice reference level, is output from the DSV calculating unit 12 as a voltage DSVV and a current DSVI. The third LPF 50 performs low-pass-filtering on the DSVV and outputs the filtering result to the second selector 52. The second selector 52 selects one of the output from the third LPF 50, a reference voltage, i.e., the ground voltage, and the voltage of a capacitor C2, in response to the selection signal S, and outputs the selection result to the adder 56. Here, the voltage of the capacitor C2 refers to the voltage obtained by charging the capacitor C2 by DSVI from the DSV calculating unit 12. The second selector 52 selects the reference voltage in response to the selection signal S if there is no need to correct the offset of the third slice reference level, and selects the output of the third LPF 50 or the voltage of the capacitor C2 if a correction to the offset of the third slice reference level is required. Here, the reference voltage may be a floating voltage of an open circuit, and ideally be connected to a resistor of infinite (∞) resistance, instead of the ground voltage. The capacitor C2 is for integrating DSVI and the third LPF 50 is for integrating DSVV.

The third selector 54 selects the output of the comparator 22 or a reference voltage, i.e., a ground voltage, in response to the selection signal, and outputs the selected result to the adder 56. That is, the third selector 54 selects the reference voltage in response to the selection signal S if there is a need to correct the offset, and selects the output of the comparator 22 in response to the selection signal S if the correction of the offset is not required. Here, the reference voltage may be that of an open circuit instead of being the ground voltage as mentioned above. The adder 56 adds the output from the second selector 52 and the output from the third selector 54, and outputs the result to the second LPF 38. Here, the fourth selector 58 selects the output from the third LPF 50 or the voltage of the capacitor C2 in response to the selection signal S, and connects the selection result to the resistor R. That is, the third slice reference level is raised if the integration result of DSVV and DSVI is a positive value, and is lowered if the integration result is a negative value.

Alternatively, the data slicing unit 10 of FIG. 2 may not comprise the offset correcting portion 24. In such a case, the output from the comparator 22 is directly provided to the second LPF 38.

FIG. 3 is a block diagram of one embodiment of the DSV calculating unit 12 shown in FIG. 1. The DSV calculating unit 12 includes an up/down counter 60 and a threshold value comparator 62.

FIGS. 4A through 4C show waveforms illustrating each element shown in FIG. 3. In particular, FIG. 4A is a graph showing the result of counting in the up/down counter 60 with time, and FIGS. 4B and 4C show DSVV and DSVI output from the DSV calculating unit 12, respectively.

The up/down counter 60 shown in FIG. 3 counts the EFM signal input through an input terminal IN3 from the data slicing unit 10, and outputs the count result, as shown in FIG. 4A, to the threshold value comparator 62. As shown in FIG. 4B, the threshold value comparator 62 outputs to the third LPF 50 of the data slicing unit 10: (i) a logic high value for DSVV, for example, 5V, if the count value of FIG. 4A is greater than a threshold value $V_{TH}$, (ii) a DSVV of high impedance (HI-Z) if the count value is equal to or greater than a threshold value $-V_{TH}$ and is equal to or less than the threshold value $V_{TH}$, or (iii) a value of αV for DSVV if it is less than the threshold value $-V_{TH}$. Also, as shown in FIG. 4C, the threshold value comparator 62 outputs to the data slicing unit 10 as DSVI: (i) a source current if the count value shown in FIG. 4A is greater than the threshold value $V_{TH}$, (ii) an infinite impedance (open) if it is equal to or greater than the threshold value $-V_{TH}$ and is equal to or less than the threshold value $V_{TH}$, or (iii) a sync current if it is less than the threshold value $-V_{TH}$.

Figure 5A:
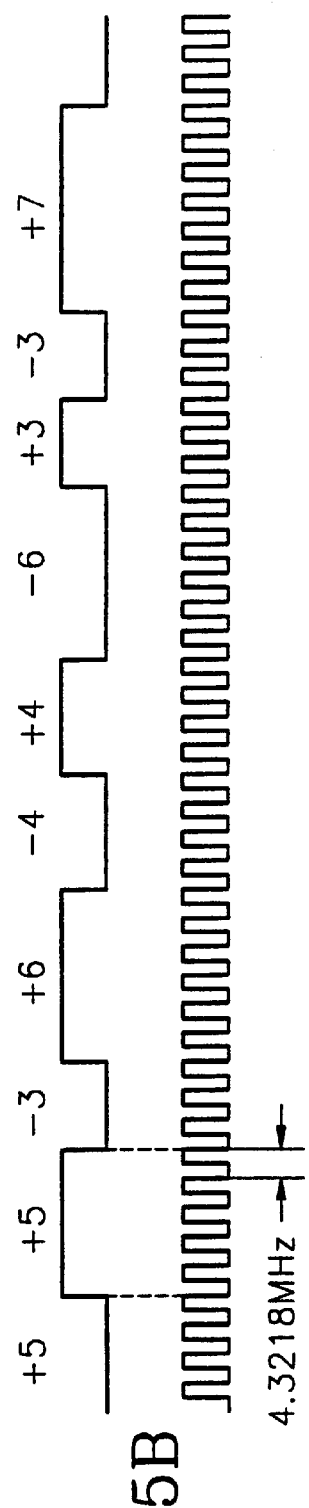
FIGS. 5A through 5C show waveforms for illustrating the operation of elements shown in FIG. 3.
Figure 5B:
Figure 5C:
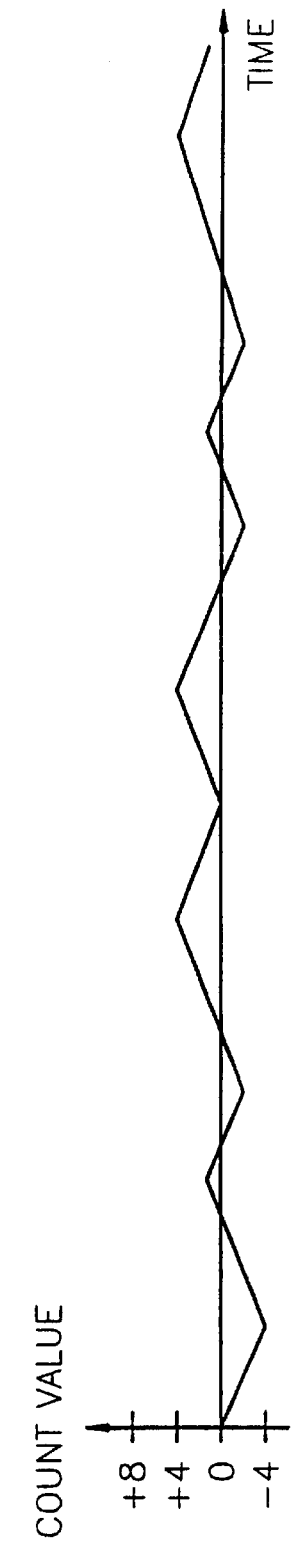

FIGS. 5A through 5C show waveforms illustrating the operation of each element shown in FIG. 3. In particular, FIG. 5A shows waveforms of an EFM signal, FIG. 5B shows waveforms of a system clock signal CK, and FIG. 5C shows the count result from the up/down counter 60.

For example, when an EFM signal as shown in FIG. 5A is output from the data slicing unit 10, the up/down counter 60 performs counting in response to the system clock signal CK as shown in FIG. 5B, and outputs the count result as shown in FIG. 5C to the threshold value comparator 62. That is, the up/down counter 60 up-counts by "1" if the EFM signal shown in FIG. 5A is at a logic high, and down-counts by "1" if the EFM signal is at a logic low. Accordingly, the count result converges on an arbitrary average.

The selection signal generating unit 14 shown in FIG. 1 generates the selection signal S in response to the number of occurrences of error correction flags input through an input terminal IN2 from the above-mentioned error correction portion, or EFM flags generated by the EFM flag generating unit 16. Here, the error correction portion generates error correction flags in accordance with the amount of error which is present in the EFM signal demodulated in the EFM signal demodulating unit. That is, the error correction portion generates error correction flags when the demodulated EFM signal has error. The reason for using the error correction flags is that error correction is performed using 8-bit data of the demodulated EFM signal.

The EFM flag generating unit 16 generates EFM flags in accordance with a bit pattern, which is not used in demodulating the EFM signal by the EFM signal demodulating unit, and outputs the EFM flags to the selection signal generating unit 14. That is, the EFM signal demodulating unit demodulates 14-bit EFM data, that is, a channel bit data, into 8-bit symbol data, which means that only $2^8(=256)$ data among $2^{14}(=16384)$ is used as effective data. That is, the remaining data, $2^{14}-2^8(=16128)$, is regarded as being useless, that is, data whose bit pattern is not changed, and the EFM flag generating unit 16 generates EFM flags in accordance with such useless data. The EFM flag generating unit 16 and the DSV calculating unit 12 may be installed in the EFM signal demodulating unit.

As illustrated in a flowchart shown in FIG. 6, a method of generating an EFM signal according to one embodiment of the present invention, which is performed by the EFM signal generating apparatus shown in FIG. 1, includes the steps of determining the distortion status of an EFM signal generated from an RF signal after a predetermined time interval T1 passes (steps 90 through 94), and converting the RF signal into an EFM signal using an appropriate method by correcting the offset of the EFM signal according to the distortion state or by redetermining the distortion state (steps 96 through 108).

Figure 7:
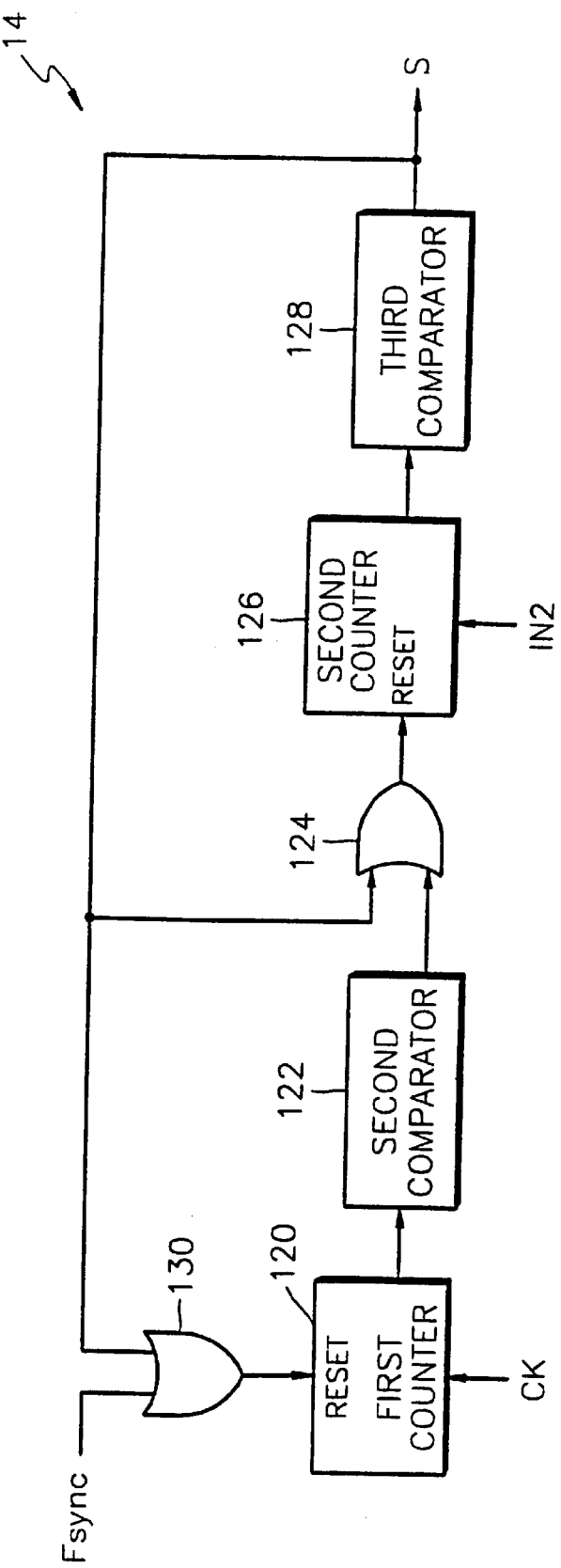
FIG. 7 is a schematic block diagram of an example of the selection signal generating unit shown in FIG. 1.

FIG. 7 is a block diagram of one embodiment of the selection signal generating unit 14 shown in FIG. 1. The selection signal generating unit 14 comprises first and second counters 120 and 126, second and third comparators 122 and 128, and OR gates 124 and 130.

Referring to FIGS. 6 and 7, a continuous determination is made as to whether a first predetermined time interval T1 has passed (step 90). The first predetermined time interval T1 may correspond to a cycle of a frame synchronization (sync) signal $F_{sync}$, $T_{FRAME}$, or a unit time of block which is equal to $98*T_{FRAME}$. In the step 90, the OR gate 130 performs an OR-operation on the frame sync signal $F_{sync}$ and the selection signal S, and outputs the result to the first counter 120. The first counter 120 counts the system clock signal CK in response to the output of the OR gate 130, which is input through a reset terminal RESET, and outputs the count result to the second comparator 122. The second comparator 122 compares the count result of the first counter 120 to the first predetermined time interval T1, and outputs the comparison result to the OR gate 124.

If the first predetermined time interval T1 has passed, the above-mentioned EFM flags or error correction flags are counted (step 92). In the step 92, the OR gate 124 performs an OR-operation on the comparison result from the second comparator 122 and the selection signal S, and outputs the result to a reset terminal RESET of the second counter 126. The second counter 126 counts the error correction flags or EFM flags input through the input terminal IN2 in response to the output of the OR gate 124. That is, when the count result of the first counter 120 is equal to the fist predetermined time interval T1, the second counter 126 is reset in response to the comparison result of the second comparator 122, which is logic high, and then counts error correction flags or EFM flags which are input through the input terminal IN2.

Then, step 94 determines whether the count result is less than a first predetermined value N1. For the determination, the third comparator 128 compares the count result from the second counter 126 to the first predetermined value N1, and outputs the comparison result as the selection signal S. If the count result from the second counter 126 is less than the first predetermined value N1, the RF signal is converted into the EFM signal by the current method (step 108). For the step 108, assuming that the third comparator 128 generates a "low" selection signal S if the count result of the second counter 126 is less than the first predetermined value N1, and generates a "high" selection signal S if the count result of the second counter 126 is not less than the first predetermined value N1, the data slicing unit 10 of FIG. 1 allows to use the current method to convert the RF signal into the EFM signal, in response to the "low" selection signal S. That is, if the current slicing on the RF signal in the data slicing unit 10 is performed according to the first slice reference level, the first selector 46 selects the first slice reference level from the amplifier 40 in response to the low selection signal S. Meanwhile, if the current slicing on the RF signal in the data slicing unit 10 is performed according to the second slice reference level, the first selector 46 selects the second slice reference level from the adder 44 in response to the low selection signal S.

However, if the count result of the step 92 is not less than the first predetermined value N1, a continuous determination is made as to whether a second predetermined time interval T2 has passed (step 96). In the step 96, if the count result from the second counter 126 is not less than the first predetermined value N1, the third comparator 128 generates the "high" selection signal S to reset the first and second counters 120 and 126. The second predetermined time interval T2 may be set to be equal to or different from the first predetermined time interval T1.

If the second predetermined time interval T2 has passed, it is determined whether to correct the offset of the third slice reference level (step 98). If it is determined not to correct the offset of the third slice reference level, the process moves to step 102. However, if the offset of the third slice reference level is to be corrected, the output value of the offset correcting portion 24 shown in FIG. 2, that is, the output from the adder 56, is reflected in the generation of the first or second slice reference level, thereby correcting the offset of the third slice reference level (step 100).

After the step 100 or after it is determined not to correct the offset in the step 98, error correction flags or EFM flags are counted (step 102). After the step 102, step 104 determines whether the count value obtained in the step 102 is less than a second predetermined value N2. If the count value is less than the second predetermined value N2, the process moves to step 108. Meanwhile, if the count value of the step 102 is not less than the second predetermined value N2, conversion of the RF signal into the EFM signal is performed by another method besides the current method. That is, the first selector 46 selects the second slice reference level in response to the selection signal S when the RF signal is sliced according to the first slice reference level under the above-mentioned assumption, and selects the first slice reference level in response to the selection signal S when the RF signal is sliced according to the second slice reference level. The steps 96, 102 and 104 are performed in the circuit shown in FIG. 7 as are the steps 90, 92 and 94.

As described above, in the apparatus and method for generating an EFM signal in an optical disk reproducing system according to the present invention, the EFM signal can be generated by different methods in consideration of distortion of EFM signal or the amount of error, so that the EFM signal can be accurately generated regardless of any defect of a disk.

While this invention has been particularly shown and described with references to preferred embodiments thereof, it will be understood by those skilled in the art that various changes in form and details may be made therein without departing from the spirit and scope of the invention as defined by the following claims.

What is claimed is:

1. An apparatus for generating an eight-to-fourteen modulation (EFM) signal in an optical disk reproducing system, the EFM signal generated from a radio frequency (RF) signal reproduced from an optical disk, comprising:

a data slicing unit for selecting, in response to a selection signal, one of a first slice reference level and a second slice reference level to be a third slice reference level, said first slice reference level being generated by correcting asymmetry of the RF signal and said second slice reference signal being generated using peak and bottom envelopes of the RF signal and the first slice reference level, said data slicing unit slicing the RF signal based on the third slice reference level to generate the EFM signal;

a selection signal generating unit for generating the selection signal in response to a number of occurrences of at least one of error correction flags and EFM flags; and an EFM flag generating unit for generating the EFM flags in accordance with bit pattern which is not used in demodulating the EFM signal, wherein error correction flags are generated in accordance with an amount of error which is present in the demodulated EFM signal.

2. The apparatus of claim 1, wherein the data slicing unit comprises:

a peak envelope detector for detecting the peak envelope of the RF signal;

a bottom envelope detector for detecting the bottom envelope of the RF signal;

a first subtractor for subtracting the bottom envelope from the peak envelope;

a first low pass filter for performing low-pass-filtering of the output of the first subtractor;

a second low pass filter for performing low-pass-filtering of the EFM signal;

an amplifier for amplifying the output of the second low pass filter by a predetermined level and outputting the amplified result to be the first slice reference level;

a second subtractor for subtracting the output of the amplifier from the output of the first low pass filter;

a first adder for adding the result from the second subtractor and the result from the first subtractor and outputting the added result to be the second slice reference level;

a first selector for selecting at least one of the first slice reference level and the second slice reference level in response to the selection signal and outputting the selected level to be the third slice reference level; and a first comparator for comparing the output from the first selector with the RF signal and outputting the comparison result to be the EFM signal.

3. The apparatus of claim 2, further comprising a digital sum value (DSV) calculating unit for comparing a count value, which corresponds to the logic level of the EFM signal, to at least one predetermined threshold value, and outputting the comparison result to be the DSV, wherein the data slicing unit corrects offset of the third slice reference level using the DSV.

4. The apparatus of claim 3, wherein the data slicing unit further comprises:

an integrator for integrating the DSV;

a second selector for selectively outputting an output of the integrator or a reference voltage in response to the selection signal;

a third selector for selectively outputting the output of the first comparator or the reference voltage in response to the selection signal;

a second adder for adding the output of the second selector and the output of the third selector and outputting the result of the addition to the second low pass filter, instead of outputting the EFM signal from the first comparator; and a resistor placed between the output of the integrator and the RF signal.

5. The apparatus of claim 1, wherein the selection signal generating unit comprises:

a first counter for counting a system clock signal in response to a frame synchronization signal or the selection signal;

a second comparator for comparing a count result from the first counter to a predetermined value;

a second counter for counting the error correction flags or the EFM flags in response to a comparison result from the second comparator or the selection signal; and a third comparator for comparing a count result from the second counter to a second predetermined value and outputting a comparison result to be the selection signal.

6. The apparatus of claim 3, wherein the selection signal generating unit comprises:

a first counter for counting a system clock signal in response to at least one of a frame synchronization signal and the selection signal;

a second comparator for comparing a count result from the first counter to a predetermined value;

a second counter for counting at least one of the error correction flags and the EFM flags in response to at least one of a comparison result from the second comparator and the selection signal; and a third comparator for comparing a count result from the second counter to a second predetermined value and outputting the comparison result to be the selection signal.

7. A method of generating an eight-to-fourteen modulation (EFM) signal from a radio frequency (RF) signal in an optical disk reproducing system, comprising the steps:

(a) continuously determining whether a first predetermined time interval has passed;

(b) if the first predetermined time interval has passed, counting flags to generate a count result;

(c) determining whether the count result is less than a first predetermined value;

(d) if the count result is less than the first predetermined value, converting the RF signal into the EFM signal by slicing the RF signal based on a slice reference level which is obtained by correcting asymmetry of the RF signal;

(e) if the count result is not less than the first predetermined value, continuously determining whether a second predetermined time interval has passed;

(f) if the second predetermined time interval has passed, counting the flags;

(g) determining whether a count value obtained in (f) is less than a second predetermined value, and if the count value obtained in (f) is less than the second predetermined value, moving the process to (d); and (h) if the count value obtained in (f) is not less than the second predetermined value, converting the RF signal into the EFM signal by slicing the RF signal based on the slice reference level which is obtained using peak and bottom envelopes of the RF signal;

wherein the flags are generated in accordance with a bit pattern which is not used in demodulating the EFM signal or the amount of error which is present in the demodulated EFM signal.

8. The method of claim 7, further comprising:

(i) if the second predetermined time interval has passed, determining whether to correct the offset of the slice reference level, and if it is determined not to correct the offset, moving the process to (f); and (j) if it is determined to correct the offset of the slice reference level, correcting the offset of the slice reference level and then moving the process to (f), wherein (f) counts the flags after (i) or (j).

* * * * *